United States Patent [19]
Regier

[11] 3,923,920
[45] Dec. 2, 1975

[54] OLEFIN DISPROPORTIONATION CATALYST AND PROCESS FOR USING SAME
[75] Inventor: Robert B. Regier, Bartlesville, Okla.
[73] Assignee: Phillips Petroleum Company, Bartlesville, Okla.
[22] Filed: May 24, 1973
[21] Appl. No.: 363,481

Related U.S. Application Data
[62] Division of Ser. No. 129,201, March 29, 1971, Pat. No. 3,761,427.

[52] U.S. Cl. ........ 260/683 D; 260/465.9; 260/653.3; 260/666 A; 260/668 A; 260/677 R; 260/672 T; 260/678; 260/680 R; 260/683.68
[51] Int. Cl. ................................. C07c 3/62
[58] Field of Search ........ 260/683 D, 680 R, 677 R, 260/465.9, 653.3, 666 A, 678

[56] References Cited
UNITED STATES PATENTS

| | | |
|---|---|---|
| 2,760,907 | 8/1956 | Attane et al. ..................... 208/136 |
| 3,087,974 | 4/1963 | Hauptschein et al. ........... 260/653.3 |
| 3,200,063 | 8/1965 | Wilson ................................ 208/111 |
| 3,466,318 | 9/1969 | Lambert et al. ................. 260/465.9 |
| 3,544,647 | 12/1970 | Pennella ............................ 260/683 |
| 3,586,731 | 6/1971 | Heckelsberg ...................... 260/683 |
| 3,637,893 | 1/1972 | Singleton .......................... 260/683 |
| 3,651,156 | 3/1972 | Scherer et al. ................... 260/653 |
| 3,697,613 | 10/1972 | Arganbright ...................... 260/683 |

Primary Examiner—Delbert E. Gantz
Assistant Examiner—C. E. Spresser

[57] ABSTRACT

An olefin disproportionation catalyst is provided comprising a minor amount of tungsten oxide or molybdenum oxide, about 0.01 to 1 weight percent of fluorine, the remainder of the catalyst substantially being silica. The process of using this catalyst to disproportionate unsaturated materials is also claimed.

11 Claims, No Drawings

OLEFIN DISPROPORTIONATION CATALYST AND PROCESS FOR USING SAME

This is a division of application Ser. No. 129,201, filed Mar. 29, 1971, now U.S. Pat. No. 3,761,427.

BACKGROUND OF THE INVENTION

1. Field of the Invention

This invention relates to disproportionation of disproportionatable unsaturated materials. In a further aspect, this invention relates to an improved catalyst for the olefin disproportionation reaction.

2. Description of the Prior Art

Numerous catalysts have recently been discovered which effect the olefin disproportionation reaction of olefinic unsaturated hydrocarbons. The reaction can be visualized as the breaking of two existing double bonds between first and second carbon atoms, and between third and fourth carbon atoms, respectively, and the formation of two new double bonds, such as between the first and third carbon atoms and the second and fourth carbon atoms, respectively, wherein the new double bonds can be on the same or different molecules. The reaction can be visualized by using a mechanistic scheme involving a cyclobutane intermediate wherein two unsaturated pairs of carbon atoms combine to form a 4-center intermediate which then disassociates by breaking either set of proposing bonds. This reaction can be illustrated by the following formulas:

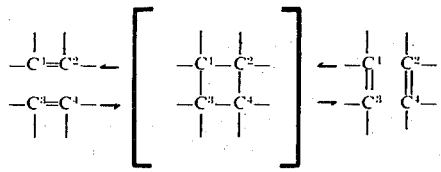

The above reaction has been described by various terms other than "olefin disproportionation". Among those terms utilized are "the olefin reaction," "olefin dismutation," "mutual cleavage," "transalkylidenation," and "olefin metathesis". Through this specification and claims, the term "olefin disproportionation" is used as a matter of choice and is deemed to be equivalent to the above-mentioned terms. In addition, it has recently been discovered that the disproportionation reaction can be applied to materials other than olefinically unsaturated hydrocarbons. Accordingly, it has been reported that acetylenically unsaturated hydrocarbons and olefinic materials which contain functional groups such as nitrile groups or fluoro groups also undergo this type of reaction.

Among the numerous catalyst systems which have been reported to effect the disproportionation reaction are those of U.S. Pat. No. 3,261,879, Banks (1966); U.S. Pat. No. 3,365,513, Heckelsberg (1968). The Heckelsberg patent discloses that tungsten oxide on silica is a suitable disproportionation catalyst.

It has also been reported in the prior art that the presence of double bond isomerization activity in a disproportionation reaction zone is advantageous in that it increases the rate of conversion and makes possible the production of a wider range of reaction products as well as products not otherwise obtainable. For example the presence of such double bond isomerization activity greatly increases the disproportionation rate of symmetrical olefins such as butene-2. In addition, the isomerization activity permits the exhaustive cleavage of high molecular weight monoolefins with ethylene to lower molecular weight monoolefins such as propylene and isobutene. British Pat. No. 1,205,677, published Sept. 16, 1970, provides a catalyst which comprises an olefin disproportionation component and a Group VIII noble metal double bond isomerization component, i.e., palladium, platinum, or ruthenium. Another catalyst system which accomplishes these results is obtained by physically mixing about 6 parts of catalytic magnesium oxide with about 1 part of tungsten oxide on silica catalyst. Other catalysts which have been developed include those obtained by copromoting an olefin disproportionation catalyst such as tungsten oxide on silica with minor amounts of the oxides of niobium, tantalum, or vanadium to provide the double bond isomerization activity.

OBJECTS OF THE INVENTION

It is an object of this invention to provide a catalyst for the disproportionation of disproportionatable materials which also has double bond isomerization activity. It is a further object of this invention to disproportionate disproportionatable materials by contacting the feed material with a catalyst having activity for both disproportionation and double bond isomerization. Other objects and advantages of the invention will be apparent from a careful reading of the summary of the invention, the detailed description of the invention, the examples, and the claims.

SUMMARY OF THE INVENTION

It has now been found that double bond isomerization activity can be introduced into a silica-containing olefin disproportionation catalyst by pretreating the silica with a fluoriding agent. Accordingly, the catalyst of the invention comprises about 0.1 to about 25 weight percent of tungsten oxide or molybdenum oxide or mixtures thereof, from about 0.01 to about 1 weight percent of fluorine, the remainder of said composition substantially being silica. The process of my invention comprises converting disproportionatable feed materials by contacting the feed with the above-described catalyst.

DETAILED DESCRIPTION OF THE INVENTION

The catalyst of the invention can employ any suitable catalytic grade of silica. Material such as silica gel, silica aerogels, flame-hydrolyzed silica gel and the like can be employed. Generally, such catalytic materials have a surface area of at least about 1 m²/g. The silica employed can contain minor amounts of other materials such as sodium or aluminum so long as these materials are of a nature or in an amount which does interfere with the conversion reaction.

The catalyst of the invention is prepared by contacting the abovedescribed catalytic silica with a suitable fluoriding agent under conditions such that a substantial amount of surface hydroxyl groups of the silica are replaced by fluorine leaving about 0.01 to about 1.0 weight percent fluoride residue on the silica. Any fluorine-containing material which is capable of effecting such a substitution can be used. The fluoriding agent is preferably non-acidic or only mildly acidic because highly acidic fluorine materials, such as HF, are not suitable in that they result in substantial loss of silica from the catalyst by solubilization and/or volatilization. In addition, highly acidic fluoriding agents generally have an adverse effect upon the surface area of the catalyst.

Suitable fluoriding agents include neutral fluoride salts such as ammonium and alkali metal fluorides. Non-limiting examples of these agents are sodium fluoride, potassium fluoride, lithium fluoride, and the like. Fluoriding agents such as ammonium and alkali metal bifluoride salts, for example, sodium bifluoride, potassium bifluoride, and the like can also be used. In addition, fluoriding agents such as ammonium silicofluoride, sodium silicofluoride, fluorosilicic acid, and the like can be employed.

The silica may be fluorided by any suitable techniques such as by contacting the silica with an aqueous solution of the soluble fluoriding agent at a temperature and a time sufficient to substitute a substantial amount of the hydroxyl groups on the surface of the silica. The above treatment is conducted for a sufficient length of time and at the selected temperature to leave a fluoride residue on the silica ranging from about 0.01 to about 1.0 percent based on the silica. When neutral solutions of the fluoriding agent are employed, no dissolution of the silica to compound such as $H_2SiF_6$ is believed to occur. However, when bifluorides are used as fluoriding agents, the time of contact of the bifluoride solution with the silica should be short enough to avoid excessive dissolution of the silica. Concentration of the fluoriding agent in the aqueous fluoriding solution can range from about 1 weight percent to saturation, and relatively concentrated solutions are preferred to facilitate the rapid replacement of the surface hydroxyl groups on the silica. Generally, the time of contact can range from about 1 minute to about several hours and the temperature can be in the range of from about 0° to about 50°C (32°–122°F).

After contact with the fluoriding agent, the silica is washed with water to remove the excess fluoriding reagent and to remove any residual alkali metal ions if alkali metal salts were used. After washing, the fluorided silica is then dried to remove substantially all the water and to insure that the fluoride will be fixed to the surface. The silica is generally dried at a temperature in the range from about 110°–150°C (230°–302°F).

The above-described silica, containing fluorine, is then impregnated with suitable amounts of a soluble tungsten and/or molybdenum compound. The amount of the soluble promoter compound is sufficient to provide a tungsten oxide and/or molybdenum oxide content in the catalyst after calcination of from about 0.1 to about 25, preferably from about 1 to about 15 weight percent, based on the total weight of the composition. The impregnation is carried out using any suitable technique and any suitable tungsten- and/or molybdenum containing impregnating agent which is convertible to the corresponding oxide on calcination. The Heckelsberg patent, discussed supra, discloses suitable promoter compounds of tungsten and molybdenum which can be employed to impregnate the fluorided silica.

After incorporation of the tungsten or molybdenum compound, or mixtures thereof, the catalyst composition is again dried and then calcined to activate it for the conversion process. The calcination can take place at temperatures in the range of 600°–1500°F. although temperatures in the range of 900°–1200°F. are preferred for optimum activity. The calcination generally takes place in the presence of an oxygen-containing gas such as flowing dry air. However other suitable gases can also be used. For example, the catalyst can be activated in nitrogen or helium, or a mixture of other suitable gases. If desired, more than one activating gas may be used sequentially during the activation. In addition, activation can also occur in an evacuated chamber. The time for the activation will generally depend upon the type of activation employed but will generally range from about 0.1 to about 25 hours. After calcination, the catalyst can be flushed and/or contacted with other gases which do not interfere with the subsequent conversion process. The finished catalyst can be in any convenient form such as pills, powder, agglomerates, extrudates, and the like.

The unsaturated feed stocks which can be converted by this catalyst are any of those which are convertible by the prior art olefin disproportionation catalyst. Thus the present invention will convert the same feeds in the same way to obtain essentially the same products as the more well known tungsten oxide on silica catalysts or molybdenum oxide on silica catalysts. Such feeds, therefore, will include disproportionatable monoolefins and polyenes both cyclic and acyclic, branched and unbranched, and mixtures of these with ethylene. Also included are those disproportionatable olefinic materials which contain functional groups such as nitrile groups or fluoro groups. Also applicable are the acetylenically-unsaturated hydrocarbons which are disproportionatable with these olefin disproportionation catalysts. The above-described unsaturated feed stocks are converted by the process of the present invention by contact with the catalyst under suitable reaction conditions, either batchwise or continuously, using any suitable mode of contact or reaction apparatus. If desired, the feed stocks can be diluted with inert diluents or solvents such as saturated hydrocarbons. Any convenient pressure can be used and pressures in the range of about 0–2000 psig are generally suitable. In a continuous process, the feed rate will vary according to the feed stock being converted to the desired degree of conversion, but it will generally be in the range of about 0.5 to about 1000 WHSV. In batch operations, the reaction time can range from about 0.1 to about 20 hours. The reaction temperature can be varied from about 400°F. to about 1100°F. When molybdenum oxide is used, the preferred temperature is 575°–840°F. for optimum activity and when tungsten oxide is used, the preferred temperature is 600°–900°F. for optimum activity.

After leaving the reaction zone, the reaction products can be separated by any conventional means and the desired products isolated and recovered. Unconverted and incompletely converted feed materials can be recycled through the reaction zone if desired for further conversion therein.

The above described invention is illustrated below by the following Example. However, it is understood that the data of the Example is for the purpose of illustration only and it should not be considered to limit the scope of the invention as described above.

EXAMPLE

Two catalysts were prepared, at the same time, which were identical except for the fluoriding treatment. The silica used for the preparation of the catalyst was a commercial catalytic grade material (Davison Grade 59) which had a surface area in the range of 240–298 $m^2/g$ and which had a pore radius in the range of 60–62 angstroms. A 5.0 g quantity of the silica (−20+40 mesh) was slurried with 10 g of aqueous 30 weight percent ammonium fluoride solution. The silica was allowed to soak for 30 minutes after which it was washed thoroughly with water and then dried for 30 minutes at 125°C. (275°F.) to remove the water and to fix the fluoride. As treated, this material contained 0.02 weight percent fluorine.

After the drying, the fluorided silica was contacted with 10 ml of an aqueous ammonium metatungstate solution containing 0.125 g of $WO_3$. The impregnated catalyst was dried, then activated by calcination in flowing air at 500°C. (932°F.) for about 1 hour. It was then flushed with dry nitrogen gas. The dried catalyst contained about 2.5 weight percent $WO_3$.

A similar catalyst was prepared for comparison with identical steps except the fluoriding treatment was omitted.

Each of the above-prepared catalysts was used in an olefin disproportionation conversion reaction wherein 1-butene feed was disproportionated to other olefins of both higher and lower molecular weight at 0 psig, at 7 WHSV, and at two different temperatures, 450°C. (842°F.) and 500°C. (932°F.). The results of these runs are shown in the Table below.

TABLE

| Catalyst | Control | | Fluorided | |
|---|---|---|---|---|
| Temp. °F. | 842 | 932 | 842 | 932 |
| Conversion, % | 27.8 | 50.8 | 33.1 | 58.2 |
| Selectivity to | | | | |
| $C_2^=$, wt. % | 18.3 | 16.5 | 8.5 | 8.2 |
| $C_3^=$ | 7.9 | 17.3 | 26.5 | 31.9 |
| $C_5^=$ | 10.6 | 21.2 | 32.8 | 33.9 |
| $C_6^=$ | 61.9 | 42.5 | 29.0 | 22.2 |
| $C_7^=$ | 1.3 | 2.3 | 3.2 | 3.8 |

It is apparent that the catalyst prepared from the fluorided silica effected higher conversions than the non-fluorided control catalyst; it was also much more active for double bond isomerization, as shown by the increased selectivity to propylene and pentenes. The primary products from the disproportionation of 1-butene, where there is little or no double bond isomerization activity, is ethylene and 3-hexene. However, when double bond isomerization activity is present, at least a portion of the 1-butene is isomerized to 2-butene resulting in substantial amounts of olefinic products such as propylene and pentenes. Such was the case with the runs using the invention fluorided catalysts.

Despite the enhanced double bond isomerization activity of the invention catalyst, it exhibited no detectable skeletal isomerization.

Reasonable modifications and variations in the invention as described herein will be apparent to those skilled in the art without departing from the spirit and scope of the invention described above.

I claim:

1. The process of disproportionating a disproportionatable feed material selected from the group consisting of disproportionatable cyclic and acyclic, branched and unbranched monoolefins and polyenes or mixtures of these monoolefins or polyenes with ethylene by contacting said material with a catalyst consisting essentially of about 0.1 to about 25 weight percent of tungsten oxide, molybdenum oxide, or mixtures thereof, about 0.01 to about 1.0 weight percent of fluorine, the remainder of said composition being substantially silica, the amount of fluorine being based on the weight of silica, and the amount of promoter material being based on the total weight of the composition.

2. A process according to claim 1 wherein the material is contacted with the catalyst at a temperature in the range of about 400° to about 1100°F.

3. A process according to claim 1 wherein the material is contacted with a catalyst in a continuous operation at a feed rate from about 0.5 to about 1000 weight hours space velocity and a pressure in the range of from about 0 to about 2000 psig.

4. A process according to claim 1 wherein the material is contacted with the catalyst in a batch operation at a reaction time of from about 0.1 to about 20 hours.

5. A process according to claim 1 wherein the catalyst contains an amount of tungsten oxide, molybdenum oxide, or mixtures thereof, which is from about 1 to about 15 weight percent.

6. A process according to claim 1 wherein the silica prior to association with the promoter material and fluorine has a surface area of at least about 1 m²/g and is a silica gel, silica aerogel, or flame hydrolyzed silica gel.

7. A process according to claim 1 wherein said catalyst is prepared by
   1. contacting a catalytic grade silica with a non-acidic fluoriding agent under conditions such that a substantial amount of the surface hydroxyl groups of the silica are replaced by fluorine,
   2. washing the fluorided silica of step (1) to remove excess fluoriding agent,
   3. drying the washed fluorided silica of step (2),
   4. impregnating the dried fluorided silica of step (3) with a compound of tungsten, molybdenum, or mixtures thereof which is convertible to the oxide of tungsten or oxide of molybdenum or mixtures of said oxides on calcination,
   5. drying the composite from step (4), and
   6. calcining the composite at a temperature of from about 600° to about 1500°F. to activate the catalyst.

8. A process according to claim 7 wherein the material is contacted with the catalyst at a temperature in the range of about 400° to about 1100°F.

9. A process according to claim 8 wherein the catalyst contains an amount of tungsten oxide, molybdenum oxide, or mixtures thereof, which is from about 1 to about 15 weight percent.

10. A process according to claim 1 wherein said fluorine is provided by contacting the silica with ammonium fluoride.

11. A process according to claim 10 wherein said catalyst consists essentially of tungsten oxide, fluorine and silica.

* * * * *